3,292,271
DEHYDRATION AND PRESERVATION OF ANIMAL HIDES AND SKINS

William J. Hopkins, Philadelphia, Fred P. Luvisi, Elkins Park, and Edward M. Filachione, Philadelphia, Pa., assignors to the United States of America as represented by the Secretary of Agriculture
No Drawing. Filed July 9, 1964, Ser. No. 381,593
10 Claims. (Cl. 34—9)

A non-exclusive, irrevocable, royalty-free license in the invention herein described, throughout the world for all purposes of the United States Government, with the power to grant sublicenses for such purposes, is hereby granted to the Government of the United States of America.

This invention relates to dehydration of animal hides and has among its objects the preparation of a dehydrated hide with excellent properties for use in tanning processes.

The term "hides" is intended to include all anmial skins which are commercially used, such as cowhides, horsehides, calfskins, pigskins, sheepskins, goatskins and fur skins.

An ideal way to preserve a perishable material such as an animal hide is by drying. The product is not only stabilized to attack by microorganisms, but is easier to handle and more economical to transport. Hides preserved by salting and brining, the current accepted practice, contain about 75% water, salt and other non-leather making substances.

Presently available methods of drying hides; dehydration with a water-miscible, volatile organic solvent such as acetone or methanol, freeze-drying under high vacuum, or sun drying in the open; suffer from serious disadvantages and are not desirable methods for producing a product suitable for tanning processes. Use of large volumes of solvents such as acetone and methanol present a fire hazard and requires special equipment to minimize loss of solvent and condensation of moisture on the hide, freeze-drying requires high vacuum equipment, and sun dried hides are hard and horny and very difficult to rehydrate.

We have discovered that fibrous, readily rehydratable dried hides may be obtained from air drying at ambient or somewhat elevated temperatures if the hides are first treated with certain water soluble polyalkylene glycols or ethers thereof.

According to the present invention the drying process comprises applying to a hide, preferably as an aqueous solution, a compound selected from the group consisting of diethylene glycol monobutyl ether (1-butoxyethoxyethanol), 1-butoxyethoxy-2-propanol, diethylene glycol diethyl ether, triethylene glycol monoethyl ether (ethoxy triglycol), triethylene glycol monomethyl ether (methoxy triglycol), a polyethylene glycol having an average molecular weight of about 400 to 1,000, or mixtures of the foregoing compounds, and drying the hide.

The product is a white, fibrous, relatively supple, dried hide which is convenient for storing and economical to ship, and which readily rehydrates to substantially the original moisture content by a short period of immersion in water. This property is in marked contrast to controls dried without the inventive treatment, resulting in inflexible, translucent, horn-like hides which are very difficult to rehydrate.

It is well known in the art (McLaughlin and Theis, "The Chemistry of Leather Manufacture," Reinhold, page 165) that "the soaking of dry hides and skins presents a special problem to the tanner. Soaking such stock in plain water is unsatisfactory because of the great length of time required and the consequent danger of bacterial attack, together with the fact that but very slight dispersion of the dried coagulable protein occurs. As a result of this, the collagen fibers are unable to swell and open properly."

Although the physico-chemical role of the added compound in the present process is not clearly definable, a discussion of some of the aspects should contribute to a better understanding of the process and assure satisfactory results from its practice. The compounds applied to the hide in the present process are not dehydrating agents per se, and their application as an aqueous solution precludes further consideration of this explanation for their action. While many of the examples describe tumbling the hide in the solution for two hours, an interval sufficient to permit considerable impregnation of the hide by the compound, the effectiveness of other applications, as immersion in a 25% solution for 15 minutes, or application of a film of the compound to the hide, demonstrate that the process is not analogous to a tannage. A possible explanation is that in the drying stage water is evaporated at a much faster rate than the compound; perhaps an equilibrium is established and the compound continues to migrate into the hide during this stage; and the presence of the compound promotes retention of a fibrous structure in the hide during dehydration. Hence, maximum effectiveness of the process is achieved for any one compound when the application procedure supplies sufficient compound to persist throughout the dehydration stages.

The air drying was typically conducted at ambient temperatures, the use of fans or other means of increasing air flow being optional. Air temperatures may be increased somewhat, especially as drying nears completion, to expedite drying of the hide. As will be obvious to those skilled in the art, the critical feature is that the temperature remain below the shrink temperature of the hide.

In addition to application of the process to green hides, skins and pelts, the procedure is also applicable to washed hides, brined or salted hides or hides in various stages of conventional tanning beamhouse processes. Thus, the hide may be unhaired by an enzyme process or by a lime system, may be bated, or may be a pickled hide; all of which may be dehydrated by the present process.

While polyalkylene glycols, or ethers thereof, other than those exemplified may be operative in the present process, not all members of these classes of compounds can be used. For example, polyethylene glycols having an average molecular weight of about 200 did not give satisfactory products, nor did those having an average molecular weight of about 1500. While the monobutyl ether of diethylene glycol (1-butoxyethoxy-ethanol) is a preferred compound, the monomethyl and monoethyl ethers of diethylene glycol gave poor results. Several diethers of ethylene glycol were tried, but the preferred compound is diethylene glycol diethyl ether. Apparently various factors; solubility, hygroscopicity, and size of molecule influence effectiveness of the compounds.

The concentration of the polyalkylene glycol or ether thereof in the aqueous solution may be varied over a considerable range and still achieve the desired effect in the dehydration process. Method of application is a factor to be considered. When the hide is agitated by tumbling in 100% float a dilute solution of somewhat more than 5%, preferably about 10% by weight of solution of the compound produced excellent results. Agitation is not a requirement, however, as immersion for short periods of time, such as 15 minutes, in solutions containing 25% or more of the compound, gave satisfactory results. Tumbling in 30% solutions, 100% float, conditions selected for preliminary screening tests, gave, with effective compounds, hides which air dried to white, fibrous, flexible products. While a higher float or concentration may be used, this is not necessary and in practice a minimum float is typically used.

The dehydration process of the present invention was demonstrated to be operative with brind hides, limed and bated hides, depickled stock, and/or enzyme unhaired hides.

Hides dehydrated by the present process were evaluated for ease of rehydration, either soon after drying or after storage for several months. It was found that the rate of rehydration was very rapid for the hides treated by the instant inventive process. Tanning studies were conducted on rehydrated hides to show that the dehydration process was not deleterious to subsequent processing of the dried hides into leather; the rehydrated hides were readily tanned by a conventional chrome tanning process.

The following examples are presented to illustrate the invention, but are not intended to be in limitation thereof. In the examples, the first six and Example 14 demonstrate the use of diethylene glycol monobutyl ether on hides in various stages of conventional processing for tanning or use of different concentrations of diethylene glycol monobutyl ether in the aqueous solution. Examples 7 to 13 and 16 show operativeness in the dehydration process of other polyethylene glycols or ethers thereof, and Example 15, employing a propylene glycol derivative, illustrates the operativeness in the present process of other polyalkylene glycols.

*Example 1*

A sample of depickled grain split cowhide, 5–6 oz. thickness, was patted with a towel to remove excess moisture and then immersed in a 25% solution of diethylene glycol monobutyl ether in water at room temperature. After 15 minutes the piece of cowhide was removed and allowed to air dry. The dried hide was white, fibrous, and relatively supple.

*Example 2*

Another sample of the depickled grain split in Example 1 was tumbled at room temperature with 100% float of an aqueous solution containing 20% by weight of diethylene glycol monobutyl ether. After 5 minutes tumbling the piece of cowhide was removed and put out to air dry. The dried hide was white, fibrous, and supple.

*Example 3*

A brine cured hide was washed a few hours in running water to remove salt. A 4″ x 3¼″ sample was tumbled in 150 ml. of 20% by weight aqueous diethylene glycol monobutyl ether solution for two hours at room temperature. The sample was removed and allowed to dry in air. The dried hide was white and fibrous; similar to the products of Examples 1 and 2.

*Example 4*

The procedure of Example 3 was repeated with the exception that the native hide was first limed, unhaired, and then bated. The dried sample was similar in appearance to that of Example 3.

*Example 5*

This procedure varied from Example 3 in that the sample was from a freshly enzyme unhaired hide and it was tumbled in 100% float of a 20% by weight aqueous diethylene glycol monobutyl ether solution. After two hours tumble at room temperature the sample was allowed to air dry. The product was white, fibrous, and flexible.

*Example 6*

A sample of depickled grain split cowhide was tumbled at room temperature in 100% float of 30% by weight of diethylene glycol monobutyl ether. After two hours tumbling the sample was removed and allowed to dry in air. The dried hide sample was white, fibrous, and flexible.

*Example 7*

The procedure of Example 6 was followed with the exception that ethoxytriglycol was used instead of diethylene glycol monobutyl ether. The dried sample was white, fibrous, and supple.

*Examples 8–10*

In these examples diethylene glycol diethyl ether (Example 8), polyethylene glycol with an average molecular weight of about 600 (Example 9), and polyethylene glycol with an average molecular weight of about 1,000 (Example 10), respectively, were used as in Example 6 at the 30% level. All of the dried pieces of hide were white, fibrous, and relatively supple.

*Examples 11–14*

These examples are similar to Example 4 in that a light brine cured hide was unhaired, limed and bated prior to taking samples. Solutions used at 100% float, two hours tumbling at room temperature were 20% ethoxytriglycol (Example 11), and 20 and 30% solutions of polyethylene glycol having an average molecular weight of about 600 (Examples 12 and 13, respectively), and 20% diethylene glycol monobutyl ether (Example 14). The samples were air dried for seven days to give white, fibrous, supple, dried pieces of hide.

*Example 15*

This example was similar to that of Examples 11 to 14 (unhaired, limed and bated hide) except that the solution (in this instance an emulsion) in which the sample was tumbled contained 30% of 1-butoxyethoxy-2-propanol ($C_4H_9OC_2H_4OCH_2CH(OH)CH_3$). The air dried product was white, fibrous, and supple.

*Example 16*

The procedure of Example 15 was repeated with the exception that the polyalkylene glycol was methoxytriglycol. The air dried product was white and fibrous, but was quite stiff and became flexible only after working.

Illustrative of the relative ease of rehydration of hides dried by the present process, a sample of depickled grain split cowhide was tumbled for 2 hours in 20% diethylene glycol monobutyl ether solution, air dried for 9 days, and then allowed to soak in tap water (no agitation), took up more than its weight of water in less than one hour as compared with more than 7 hours for an untreated control. After 3 months storage at room temperature the dried hide samples of Examples 6 and 7 took up 115 and 96% of their weight in water in 2 hours stationary soak. The dried products of Examples 11–13, which were treated with either ethoxytriglycol or polyethylene glycol, rehydrated readily and became soft and flacid. Rehydration of the sample treated with diethylene glycol monobutyl ether, Example 14, was satisfactory, but the rehydrated hide was not as soft and flacid as that of Examples 11–13.

*Example 17*

To demonstrate that our invention does not interfere with conventional tanning processes the following experiments were conducted. Samples of hide dehydrated by our process (Examples 11, 12, and 14) were rehydrated in water. These were then pickled and tanned simulating conventional chrome tanning practice. As a control, pickled stock obtained from a side leather tanner also was tanned in the conventional way. Shrinkage temperature and uptake of chrome were determined. The results are summarized in the table below. It is evident that hides dehydrated for preservation by our process were equivalent to hides conventionally used in tanning processes.

| Dehydration Data | | Leather from Rehydrated Sample | |
|---|---|---|---|
| Example No. | Compound | $T_s$, °C. | Percent $Cr_2O_3$ |
| 11 | Ethoxytriglycol | 92 | 3.08 |
| 12 | Polyethylene glycol, ave. mol. wt. 600. | 92 | 3.12 |
| 14 | Diethylene glycol, monobutyl ether. | 92 | 3.18 |
| Control | Not dehydrated | 92 | 3.35 |

Hides dehydrated by our process are also satisfactorily tanned with the other conventional tanning agents such as the vegetable tannins, zirconium salts, aluminum salts, and syntans. Thus hides and skins dehydrated by the present invention may be readily rehydrated and tanned.

It will be obvious to those skilled in the art to apply the process of the present invention to the dehydration of other protein materials, particularly proteins which are considered essentially collagenous (at least about 80% by weight of solids), such as sausage casings and sutures, or products containing substantial amounts of water insoluble protein such as cuts of meat. Accordingly, it is to be understood that the invention is not restricted to the exact procedures hereinbefore described, as modifications and equivalents will be apparent to one skilled in the art.

We claim:
1. A process for preparing hides for air-drying without the use of solvent-extractants which comprises applying to a hide a compound selected from the group consisting of diethylene glycol monobutyl ether, 1-butoxyethoxy-2-propanol, diethylene glycol diethyl ether, triethylene glycol monoethyl ether, triethylene glycol monomethyl ether, a polyethylene glycol having an average molecular weight of about 400 to 1,000, and mixtures thereof and drying said hide.

2. The process of claim 1 in which the method of applying said compound comprises agitating said hide in the presence of an aqueous solution containing more than 5% by weight of said compound.

3. The process of claim 2 in which the compound is diethylene glycol monobutyl ether.

4. The process of claim 2 in which the compound is 1-butoxyethoxy-2-propanol.

5. The process of claim 2 in which the compound is triethylene glycol monoethyl ether.

6. The process of claim 2 in which the compound is diethylene glycol diethyl ether.

7. The process of claim 2 in which the compound is polyethylene glycol having an average molecular weight of about 600.

8. The process of claim 2 in which the method of applying said compound comprises immersing said hide in a solution containing at least about 25% by weight of said compound.

9. The process of claim 8 in which the compound is diethylene glycol monobutyl ether.

10. A process for preparing collagenous material for air-drying without the use of solvent-extractants which comprises applying to an essentially collagenous material a compound selected from the group consisting of diethylene glycol monobutyl ether, 1-butoxyethoxy-2-propanol, diethylene glycol diethyl ether, triethylene glycol monoethyl ether, triethylene glycol monomethyl ether, a polyethylene glycol having an average molecular weight of about 400 to 1,000, and mixtures thereof and drying said collagenous material.

References Cited by the Examiner
UNITED STATES PATENTS 2,906,591   9/1959   Ushakoff _____ 34—9 X
2,917,833   12/1959  Kremen et al. _____ 34—9
3,048,929   8/1962   Kremen et al. _____ 34—9

FREDERICK L. MATTESON, Jr., *Primary Examiner.*

D. A. TAMBURRO, *Assistant Examiner.*